United States Patent Office 3,235,546
Patented Feb. 15, 1966

3,235,546
IMIDAZOLE AND THIAZOLE COMPOUNDS AND METHOD OF PREPARATION
Frederick S. Kaveggia, Los Angeles, and Isidore Pollack, Westminster, Calif., assignors to Purex Corporation, Ltd., Lakewood, Calif., a corporation of California
No Drawing. Filed July 3, 1962, Ser. No. 207,413
10 Claims. (Cl. 260—240)

This invention relates to a novel group of compounds, and is particularly concerned with a novel group of compounds, containing the thiazole or imidazole ring, and to a method of preparation of these compounds.

Fluorescent dyes and chemicals are now widely used in many arts. Thus, for example, fluorescent dyes are employed as textile dyes and are also used in inks, paints, pigments, dye penetrants for inspection of the surface of objects such as metals, to detect cracks and flaws therein, for coloring of metals, and the like.

It is an object of the invention to provide a novel class of compounds, many of which are capable of possessing fluorescent characteristics.

Another object is the provision of a class of compounds having a plurality of functional groups, e.g., mercapto or amino groups, capable of further reaction, e.g., to form polymeric materials.

Yet another object is the provision of procedure for producing the compounds of the invention.

Other objects and advantages will appear hereinafter.

According to the invention, a secondary amine carrying an additional functional group of the class consisting of mercapto and primary amino groups, and wherein such functional group and the secondary amino group are attached to adjacent carbon atoms, can be reacted at relatively high temperatures with a tricarboxylated compound of the group consisting of citric acid, aconitic acid, tricarballylic acid, and esters thereof, to form a thiazole-type or imidazole-type linkage, and usually also an amido linkage, between the secondary amine and the tricarboxylated compound, splitting off water and either $H_2S$ or ammonia, or alcohol instead of water when a tricarboxylated ester compound is employed, and resulting in a novel and valuable class of compounds.

As will be pointed out more fully below, it is also believed that two molecules of the tricarboxylated compound are linked together by one molecule of the secondary amine.

The compounds produced according to the invention are basically 2,3-substituted 1,3-thiazoles or 1,3-imidazoles of the general type represented by the formula:

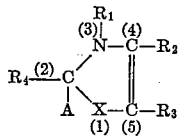

(I)

wherein A is a member of the group consisting of a decarboxylated citric acid radical, a decarboxylated aconitic acid radical, a decarboxylated tricarballylic acid radical, and the corresponding decarboxylated ester radicals, e.g., a decarboxylated citric acid ester radical, a decarboxylated aconitic acid ester radical, or a decarboxylated tricarballylic acid ester radical, and from which at least one carboxylic group has been removed: X is a member of the class consisting of —S— and —NH— groups:

$R_1$ is an alkyl radical, e.g., containing from 1 to about 22, preferably about 1 to about 12, carbon atoms, such as methyl, ethyl, propyl, isopropyl, butyl, amyl, octyl, nonyl, decyl, undecyl, duodecyl, and the like, and including cycloalkyl, e.g., cyclopentyl, cyclohexyl, and the like; an aryl radical, either monocyclic or polycyclic, such as phenyl, naphthyl, and the like; or alkaryl or aralkyl, such as methyl phenyl or ethyl phenyl, tolyl, phenyl ethyl, and the like; and wherein said alkyl, aryl, alkaryl and aralkyl substituents can be further substituted, e.g., by sulfonic acid groups, hydroxy groups, and the like; $R_2$, $R_3$ and $R_4$ are each hydrogen, or an alkyl, aryl, alkaryl or aralkyl radical, substituted or unsubstituted, as described above, and wherein $R_2$, $R_3$ and $R_4$ may be the same or different.

As will be pointed out more fully below, usually only one of the carboxylic groups in each molecule of the tricarboxylated compound, that is, citric, aconitic or tricarballylic acid, or the esters thereof, reacts with the secondary amine to form the above-noted thiazole-type or imidazole-type ring, so that under these conditions only one of the three carboxylic groups of the above tricarboxylated compound is replaced by such ring.

As previously noted, amidation of at least one of the other two carboxylic groups of the above tricarboxylated compound also takes place in the reaction, to produce a structure having the general formula:

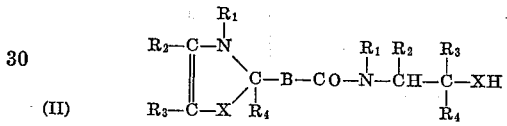

(II)

where B is a member of the group consisting of a decarboxylated citric acid radical, a decarboxylated aconitic acid radical, a decarboxylated tricarballylic acid radical, and the corresponding decarboxylated ester radicals, and from which at least two carboxylic groups have been removed; and X, $R_1$, $R_2$, $R_3$ and $R_4$ have the values above noted.

As previously indicated, two molecules of the tricarboxylated compound, citric acid, tricarballylic acid, aconitic acid, or their esters, are linked together by a secondary amine residue through an amide linkage, and either a thioester or a second amide linkage, as result of reaction of the secondary amino group of one molecule of the amine with one carboxylic group on the first molecule of the tricarboxylated compound, and reaction of the mercapto or primary amino group of such amine molecule with a carboxylic group on the second molecule of the tricarboxylated compound. The resulting reaction product has the following general formula:

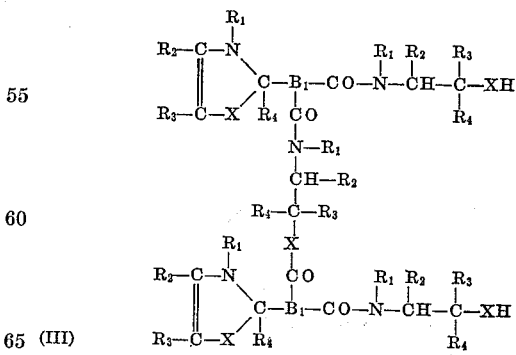

(III)

wherein $B_1$ is a member of the group consisting of a decarboxylated citric acid radical, a decarboxylated aconitric acid radical, and a decarboxylated tricarballylic acid radical, from which all three carboxyl groups have been removed, and X, $R_1$, $R_2$, $R_3$ and $R_4$ have the values above defined.

The most desirable compounds are those wherein $R_2$, $R_3$ and $R_4$ in Formula III above are all hydrogen, and also wherein X is NH.

The following are some specific examples of novel compounds, according to the invention:

(a) 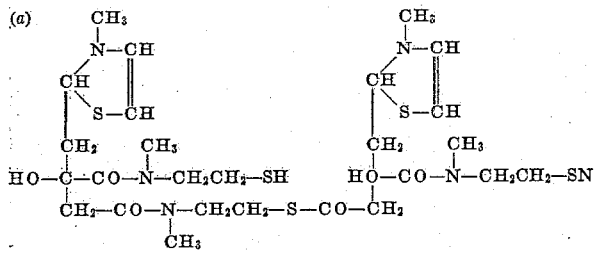

(b) 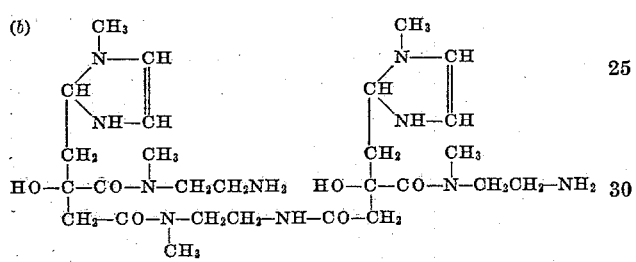

(c) 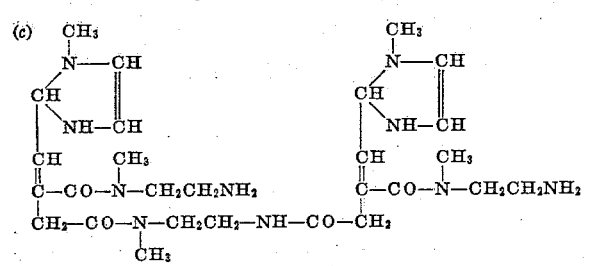

(d) 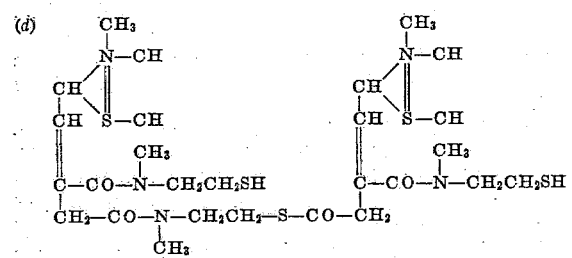

(e) 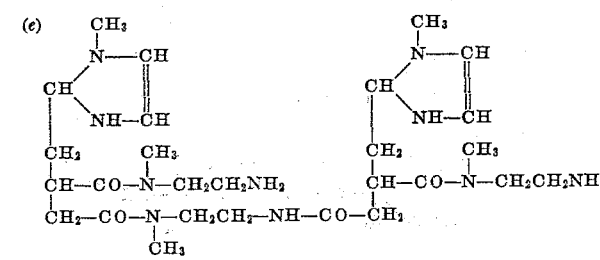

(f) 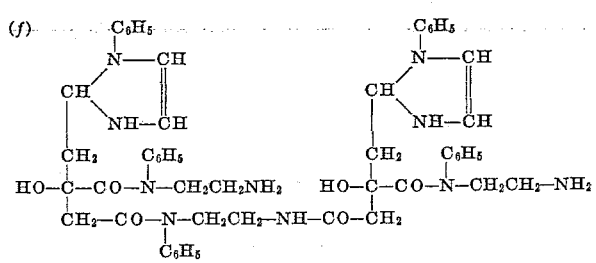

(g) 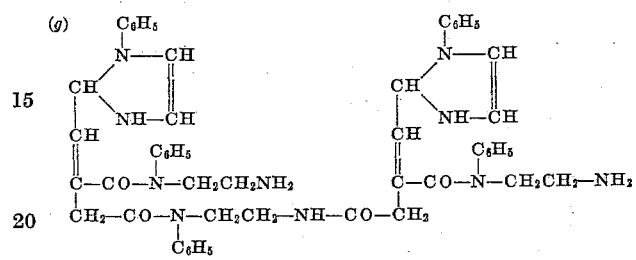

(h) 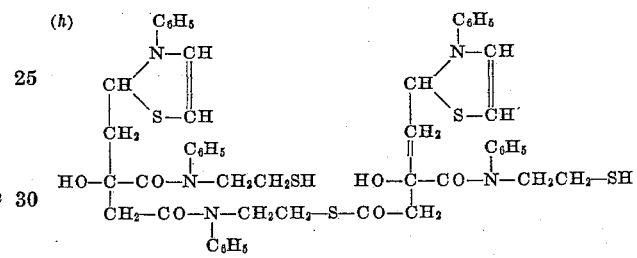

(i) 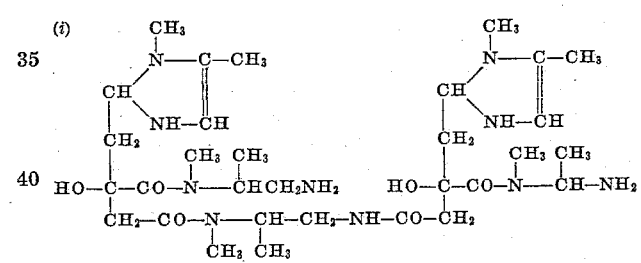

(j) 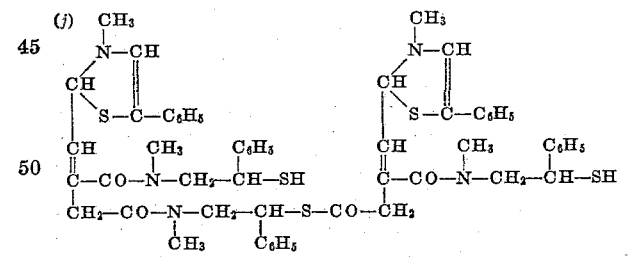

(k) 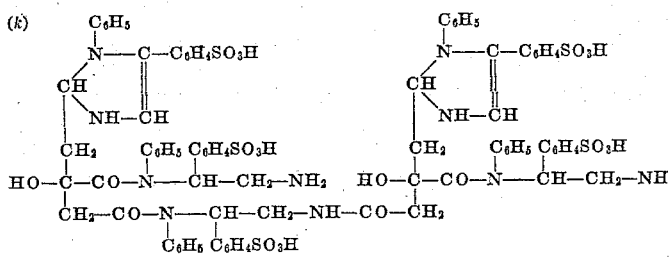

(l) 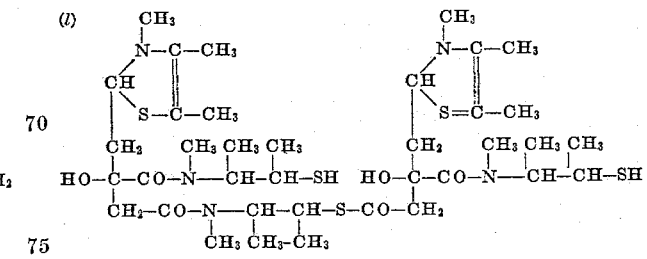

(m) 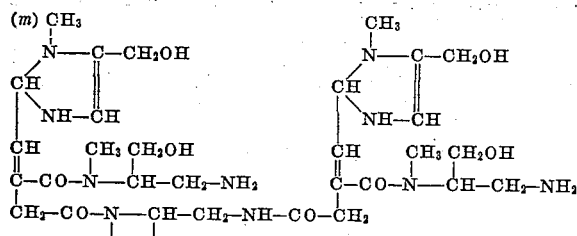

(n) 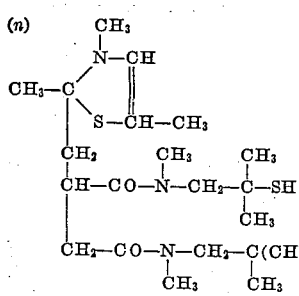

Secondary amines of the type noted above which can be reacted with the above tricarboxylated compound for producing the compounds hereof have the general formula:

(IV) $$NH-\underset{R_4}{\underset{|}{CH}}-\underset{}{\overset{R_2}{\underset{|}{C}}}-XH \quad \begin{matrix}R_1 & R_2 & R_3\end{matrix}$$

where X, $R_1$, $R_2$, $R_3$ and $R_4$ have the values above defined.

Examples of secondary amines according to Formula IV which can be employed in the reaction with citric, aconitic or tricarballylic acid, or their esters, to produce the reaction products or novel compounds of the invention are the following:

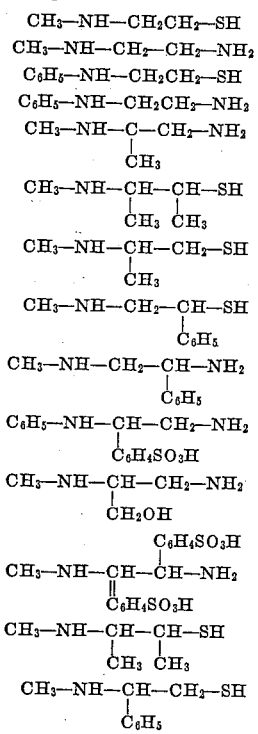

As the tricarboxylated reactant, the tricarboxylic acids, citric acid, aconitic acid, tricarballylic acid, or their substituted derivatives are suitable. Substituted citric, aconitic, or tricarballylic acids which can be employed may be, for example, the alkyl e.g., methyl, ethyl, propyl and the like, derivatives, and the aryl, e.g., phenyl and naphthyl, derivatives of citric acid, aconitic acid, or tricarballylic acid.

The esters, e.g., the alkyl esters, of citric acid, of aconitic acid, of tricarballylic acid, or their substituted derivatives, may also be employed. These are generally in the form of triesters, although mixed acid-esters may be employed such as the diesters of citric, aconitic and tricarballylic acids. Thus, for example, triethyl citrate, triethyl aconitate, or triethyl carballylate can be employed, and diethyl citrate, diethyl aconitate and diethyl carballylate may also be suitable. The corresponding methyl, propyl and butyl esters can also be used. Substituted citric, aconitic, or tricarballylic acid esters which may be employed include the alkyl, e.g., methyl, ethyl, propyl, and the like, derivatives, and the aryl, e.g., phenyl and naphthyl derivatives, of citric acid ester, aconitic acid ester, or tricarballylic acid ester.

The terms "a citric acid," "a citric acid ester," "an aconitic acid," "an aconitic acid ester," "a tricarballylic acid," and "a tricarballylic acid ester," as employed herein, are intended to denote either the unsubstituted or the substituted acids and esters. The preferred tricarboxylated compounds are the unsubstituted citric acid, aconitic acid, and tricarballylic acid, and their unsubstituted triesters.

The reaction between the amine and the tricarboxylated compound may be carried out by forming a mixture of the amine and the tricarboxylic acid or ester in the desired molar proportions, as described more fully below. The mixture is then stirred while low heat is applied over a period of, say, 15 to 20 minutes, to form a melt. When a completely homogeneous melt is obtained, the application of heat is increased and the melt is rapidly heated to temperature in the range of about 300° to about 400° F., until frothing occurs. The reaction mixture is further heated and maintained at temperatures in the above range for a period, e.g., about 10 to 20 minutes, until frothing ceases, indicating completion of the reaction. Water or alcohol, together with $H_2S$ or ammonia, are formed in the reaction, depending on whether a tricarboxylic acid or ester, and a secondary amine containing a mercapto group or an additional primary amino group are employed.

When the reaction is completed, the reaction product is purified and separated from the reaction mixture by extracting the reaction mixture, preferably with a solvent for the excess amine and in which the reaction product is insoluble, e.g., isopropyl alcohol or benzene, thus forming a solvent solution containing the excess amine, and removing such solvent solution, e.g., by decantation from the reaction mixture. The alcohol insoluble portion, containing water or alcohol, and residual organic solvent, is then heated to evaporate water or alcohol, and remaining solvent, and the residue comprising reaction product is then dried.

As an alternative to the above purification procedure, a solvent can be used in which the reaction product is soluble and in which the excess amine is insoluble, thus extracting a solvent solution of the product, and removing the solvent by distillation to recover the product.

Alternatively, the above-described solvent extractions can be omitted, and instead the reaction mixture can be subjected to vacuum distillation to drive off the amine and water, or alcohol, if present, followed by drying the reaction product residue.

The reaction products of the invention may be soluble in water in some instances and solvent soluble in other instances. Generally, where the substituent attached to the secondary nitrogen of the amine reactant or to a carbon atom thereof is an aromatic radial, e.g., phenyl, or a relatively long chain alkyl radical, e.g., containing above 4 or more carbon atoms, the resulting compound may be soluble in organic solvents such as alcohols, e.g., butanol, in ketones such as acetone, or other organic solvents. Where the substituent attached to the secondary nitrogen of the amine or to a carbon atom thereof is a short chain alkyl radical of say about 1 to 3 carbon atoms, the resulting compounds may be soluble in water.

The compounds of the invention may be produced employing a molar proportion of at least 1 mol of the amine per mol of the tricarboxylated compound. The preferred products, having the general Formula III above, may be prepared by employing in the condensation reaction at least 5, and preferably at least 6, e.g., between 6 and 8, mols or more of the secondary amine, e.g., N-methyl ethylene diamine, per 2 mols of a citric acid, an aconitic acid, or a tricarballylic acid, or their respective esters (i.e., at least a 3:1 molar ratio of secondary amine to such tricarboxylated compounds).

Although only 5 mols of the secondary amine react with each 2 mols of a citric acid, an aconitic acid, or a tricarballylic acid, or their respective esters, to form the compound of Formula III, it is preferred to employ at least one mol of the amine in excess of such stoichiometric amount of 5 mols for each 2 mols of the above tricarboxylated compound to insure formation of a product of the structure of Formula III and represented by the specific compounds $a$ to $o$ above.

Although preferred compounds may be prepared by reacting the secondary amine and a citric acid, an aconitic acid, or a tricarballylic acid, or their esters, in a molar proportion of from 3 to 4 mols of the amine per mol of the acid or ester, useful compounds may be prepared employing a molar proportion of less than 3, e.g., from 1 to about 2.5 mols of the amine per mol of the acid or ester. Employing the above less preferred lower molar proportions of amine to tricarboxylated compound, products are formed which, although not having the preferred structure illustrated in Formula III, have the typical thiazole or imidazole ring structure linked to a decarboxylated citric, aconitic, or tricarballylic acid radical, or their respective ester radicals, according to the general Formula I above, and which may also have an amide linkage, as illustrated by general Formula II above, if sufficient amine is employed to form both types of linkages. These reaction products are also contemplated within the purview of the invention.

Certain of the invention compounds, particularly those compounds formed from a citric acid, an aconitic acid, or their esters, have capability of emitting fluorescent light in the visible region of the spectrum when irradiated with "black light" or ultraviolet light. The fluorescent compounds or fluorescent dyes which may be produced according to the invention may be used to color cotton or nylon. Thus, for example, such compounds, e.g., Compound ($j$) above, may be sulfonated, e.g., on the aromatic nucleus, or a sulfonated reaction product may be formed from a sulfonated aromatic reactant, such as sulfonated aryl-substituted secondary amine e.g., Compound $k$ above. The provision of a sulfonated reaction product may confer substantive properties on the dye, e.g., with respect to cotton. In weakly acid baths, e.g., aqueous acetic or boric acid solutions, the fluorescent dyes which may be formed according to the invention, may be substantive to and be exhausted on nylon and Acrilan.

Further, fluorescent dyes obtainable according to the invention may be employed in formulations useful for leak detection, in dye penetrants for detection of flaws in surfaces of bodies, in paints, and the like.

Since the invention compounds contain a plurality, e.g., two or more free mercapto or free amino groups (see Formula III above), these compounds may serve as intermediates for further reaction or coupling with other compounds, to produce useful polymers or dyes. For example, the compounds of the invention may be reacted with a dicarboxylic acid, e.g., succinic or adipic acid, to produce polymeric compounds in the form of plastics, films, or fibers.

The following are illustrative examples of preparation of the compounds or dyes of the invention.

Example 1

38 grams (0.2 mol) of citric acid are mixed with 45 grams (0.6 mol) of N-methyl ethylene diamine. The mixture is heated slowly until a melt is obtained, and then more rapidly to between 300° and 400° F. until frothing ceases. After the reaction is completed, the product may be vacuum distilled to remove excess amine. The product thereby obtainable is Compound $b$ above.

Example 2

17.4 grams of aconitic are reacted with 22 grams of N-methyl ethylene diamine (1:3 mol ratio), by slow addition of the amine to the aconitic acid. The reaction mixture is slowly heated to about 350° F. until frothing ceases. The product thus obtained may be purified by solvent extraction, e.g., with isopropyl alcohol, to remove excess amine, or by vacuum distillation. The reaction product is Compound $c$ above.

Example 3

17.4 grams of aconitic acid are reacted with 27 grams of N-methyl thioethanolamine by slowly adding the amine to the acid (1:3 mol ratio). The reaction mixture is heated to between about 300° and 400° F. until frothing ceases. The product obtained may be purified by solvent extraction with isopropyl alcohol, to remove excess amine, or by vacuum distillation. The reaction product is Compound $d$ above.

Example 4

The procedure of Example 3 is repeated, employing in place of aconitic acid, an equimolar quantity of citric acid. A product, Compound $a$ is obtained.

Example 5

The procedure of Example 1 is repeated, employing a molar proportion of about 3.5 mols of N-methyl ethylene diamine per mol of citric acid.

Example 6

The procedure of Example 1 is repeated, except employing a mol ratio of 2 mols N-methyl ethylene diamine per mol of citric acid.

Example 7

The procedure of Example 1 is repeated employing triethyl citrate in place of citric acid, using a proportion of about 3 mols of N-methyl ethylene diamine to 1 mol of triethyl citrate, to obtain the same Compound $b$ as in Example 1.

Example 8

The procedure of Example 1 is repeated, employing tricarballylic acid instead of citric acid. The product thereby obtainable is represented by Formula $e$ above.

While we have described particular embodiments of our invention for purposes of illustration, it should be understood that various modifications and adaptations thereof may be made within the spirit of the invention, as set forth in the appended claims.

We claim:
1. A compound having the formula:

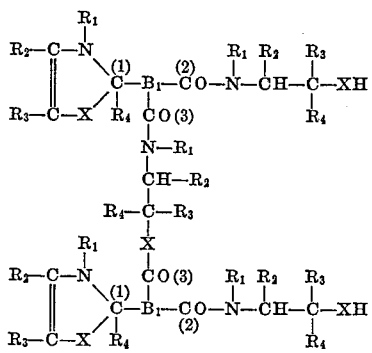

wherein $B_1$ is a member of the group consisting of the citric acid radical, the aconitic acid radical, and the tricarballylic acid radical, from which all three carboxyl groups have been removed and replaced by the three radicals attached to each $B_1$ group; X is a member of the class consisting of —S— and —NH— groups; $R_1$ is a member selected from the class consisting of alkyl of from 1 to 22 carbon atoms, and aryl; and $R_2$, $R_3$ and $R_4$ are each a member selected from the class consisting of hydrogen, alkyl of from 1 to 22 carbon atoms, and aryl, the numbers (1), (2) and (3) indicating the position of the carboxyl groups in the $B_1$ radical which have been replaced by the respective radicals adjacent the numbers (1), (2) and (3).

2. A compound having the formula:

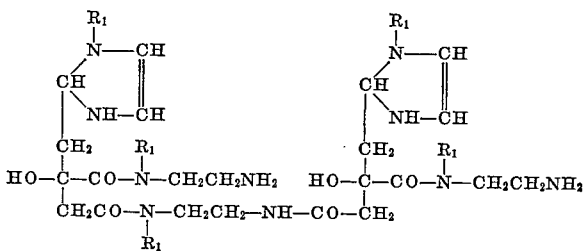

where $R_1$ is alkyl of from 1 to 12 carbon atoms.

3. A compound having the formula:

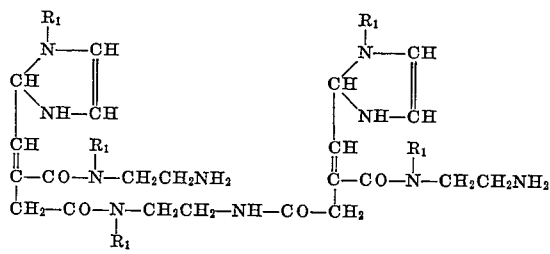

where $R_1$ is alkyl of from 1 to 12 carbon atoms.

4. A compound having the formula:

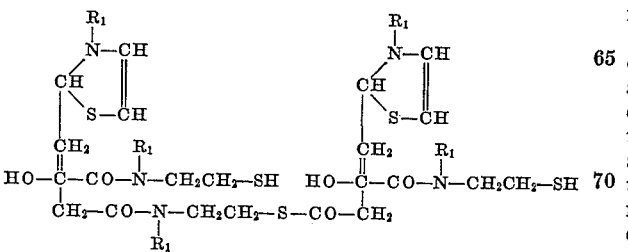

where $R_1$ is alkyl of from 1 to 12 carbon atoms.

5. A compound having the formula:

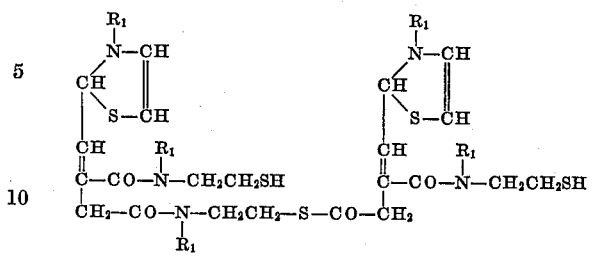

where $R_1$ is alkyl of from 1 to 12 carbon atoms.

6. A compound having the formula:

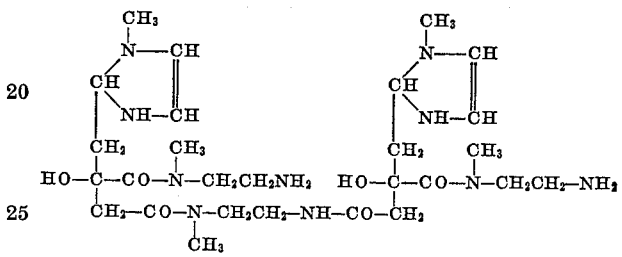

7. A compound having the formula:

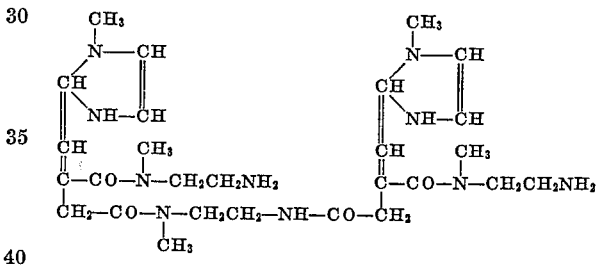

8. The process which comprises heating a mixture consisting essentially of a secondary ethyl amine carrying an additional member selected from the class consisting of mercapto and primary amino, and a tricarboxylated compound selected from the group consisting of citric acid, aconitic acid, tricarballylic acid, and the lower alkyl esters thereof, in a molar ratio of at least one mol of the amine per mol of the tricarboxylated compound, to form a melt, raising the temperature of the mixture in the range of about 300 to about 400° F. until frothing occurs, and maintaining the temperature in the aforementioned range for a period until frothing ceases and recovering the reaction product.

9. The process which comprises heating a mixture consisting essentially of N- methyl ethylene diamine and citric acid in a molar ratio of the amine to the acid of from about 3:1 to about 4:1, to form a melt, heating the reaction mixture at elevated temperature between about 300 and about 400° F. until frothing occurs, continuing the reaction in the aforementioned temperature range until frothing of the reaction mixture substantially ceases, removing excess amine from the reaction mixture, and recovering the reaction product.

10. The process which comprises heating a mixture consisting essentially of N- methyl ethylene diamine and aconitic acid in a molar ratio of the amine to the acid of from about 3:1 to about 4:1, to form a melt, heating the reaction mixture at elevated temperature between about 300 and about 400° F. until frothing occurs, continuing the reaction in the aforementioned temperature range until frothing of the reaction mixture substantially ceases, removing excess amine from the reaction mixture, and recovering the reaction product.

(References on following page)

References Cited by the Examiner

UNITED STATES PATENTS

| | | | |
|---|---|---|---|
| 2,118,432 | 5/1938 | Gessler | 8—76 |
| 2,484,146 | 10/1949 | Barber et al. | 260—309.6 |
| 2,520,102 | 8/1950 | Tryon | 260—309.6 |
| 2,574,537 | 11/1951 | De Groote et al. | 260—309.6 |
| 2,635,079 | 4/1953 | Valko et al. | 260—309.6 |
| 2,823,207 | 2/1958 | Nys et al. | 260—306.7 |
| 2,824,877 | 2/1958 | Cheney et al. | 260—306.7 |
| 2,865,927 | 12/1958 | Cain | 260—309.6 |
| 2,878,234 | 3/1959 | Peterson | 260—309.6 |
| 2,899,441 | 8/1959 | Dornfeld | 260—309.6 |
| 2,920,937 | 1/1960 | Burns | 260—309.6 |
| 2,940,816 | 6/1960 | Sniegowski | 8—76 |
| 2,950,211 | 8/1960 | Huber et al. | 260—309.6 |
| 2,987,514 | 6/1961 | Hughes et al. | 260—309.6 |
| 2,992,230 | 7/1961 | Lescisin | 260—309.6 |
| 3,029,236 | 4/1962 | Steauble et al. | 260—249.5 |
| 3,078,136 | 2/1963 | Trosken et al. | 8—76 |
| 3,138,610 | 6/1964 | Buc et al. | |

OTHER REFERENCES

Conant et al., The Chemistry of Organic Compounds, 5th ed., p. 334, New York, MacMillan, 1959.

Fieser et al., Organic Chemistry, 3rd ed., p. 179, New York, Reinhold, 1956.

Shriner et al., The Systematic Identification of Organic Compounds, 3rd ed., pp. 3–16, New York, Wiley, 1948.

WALTER A. MODANCE, *Primary Examiner.*

IRVING MARCUS, NICHOLAS S. RIZZO, *Examiners.*

N. TROUSOF, *Assistant Examiner.*